US006628323B1

United States Patent
Wegmann

(10) Patent No.: US 6,628,323 B1
(45) Date of Patent: Sep. 30, 2003

(54) METHOD AND APPARATUS FOR SURVEYING A PREDETERMINED SURVEILLANCE AREA

(75) Inventor: Max Wegmann, Burgdorf (CH)

(73) Assignee: Ascom Systec AG, Magenwil (CH)

(*) Notice: Subject to any disclaimer, the term of this patent is extended or adjusted under 35 U.S.C. 154(b) by 0 days.

(21) Appl. No.: 09/424,079

(22) PCT Filed: Jun. 3, 1998

(86) PCT No.: PCT/CH98/00236
§ 371 (c)(1),
(2), (4) Date: Nov. 19, 1999

(87) PCT Pub. No.: WO98/56182
PCT Pub. Date: Dec. 10, 1998

(30) Foreign Application Priority Data

Jun. 4, 1997 (CH) .............................. 1332/97
Feb. 16, 1998 (CH) .............................. 368/98

(51) Int. Cl.⁷ .................................................. H04N 7/18
(52) U.S. Cl. ...................... 348/143; 348/169; 348/154; 348/155
(58) Field of Search ................................ 348/143–159, 348/169–171

(56) References Cited

U.S. PATENT DOCUMENTS 4,807,027 A * 2/1989 Muto .......................... 340/541
5,091,780 A * 2/1992 Pomerleau ................... 348/152
5,153,722 A 10/1992 Goedeke et al.
6,028,626 A * 2/2000 Aviv .......................... 348/152

FOREIGN PATENT DOCUMENTS

| FR | A2606572 | 5/1988 |
| FR | A2713806 | 6/1995 |
| GB | A2257598 | 1/1993 |
| WO | A8800784 | 1/1988 |

* cited by examiner

Primary Examiner—Andy Rao
(74) Attorney, Agent, or Firm—Birch, Stewart, Kolasch & Birch, LLP

(57) ABSTRACT

The invention relates to an automatic surveillance system whereby characteristic data are first determined from a section of a signal (an instantaneous video image) using an automatic image analysis. This data is then stored temporarily or permanently with a time tag, so that it can be compared statistically with certain other time references. This statistical comparison enables the inventive surveillance system to identify abnormal situations and to selectively bring them to the attention of the surveillance officer. The invention is characterized in that the system itself identifies which situations are abnormal and require closer examination. It is not necessary to specify in advance what constitutes abnormal in a given surveillance situation, since after a certain period of running, the system itself will have collected the data corresponding to a normal situation.

12 Claims, 2 Drawing Sheets

METHOD AND APPARATUS FOR SURVEYING A PREDETERMINED SURVEILLANCE AREA

This application is the national phase under 35 U.S.C. §371 of PCT International Application No. PCT/CH98/00236 which has an International filing date of Jun. 3, 1998 which designated the United States of America.

BACKGROUND OF THE INVENTION

The invention relates to a process and apparatus for surveying a given surveillance area using a detection device, especially at least one video camera and/or microphone.

PRIOR ART

Security surveillance of facilities and spaces takes place on the one hand using specific physical sensors (for example, photoelectric barriers, motion detectors, gas sensors) and on the other hand using video cameras. Video cameras have the advantage that assessment of the situation from afar can be done by an guard and that consequently even relatively complex situations which cannot be acquired using specific physical sensors can be comprehensively surveyed.

To be able to minimize costs for surveillance personnel, generally a larger number of cameras are connected to be able to be switched to a few common monitors. Switching can take place in given cycles or selectively (for example when motion is detected).

One problem of surveillance by video cameras is that the guard becomes fatigued over time. The video images are viewed only superficially or sporadically over time.

SUMMARY OF THE INVENTION

The object is to devise a process of the initially mentioned type which makes surveillance with video cameras much more reliable and also more efficient.

In the process, first the characteristic data are determined from an instantaneous signal segment by automatic signal analysis. These data are stored or buffered as a data set (for example with a time stamp) in order to then be statistically compared to data from other data sets which meet certain criteria.

By statistical comparison the surveillance system can recognize extraordinary situations and selectively notify the guard of them. Here it should be watched that the system itself recognizes which situations are extraordinary and therefore must be checked more closely. Nor is it necessary to establish beforehand what should be considered extraordinary in a certain surveillance situation. After a certain start-up time the system by itself has collected the statistics of a ordinary situation. (It is not disruptive if extraordinary situations arise in the start-up time since they do not have significant effects on statistics anyway due to their infrequency).

Within the framework of automatic image analysis the video image is preferably broken down into several segments (image regions). The segments can partially overlap or can be completely disjunctive. For each segment characteristic data or features are determined accordingly. The different segments can be treated the same or differently. In the former case for example the same data set is determined for each segment. In the latter case on the other hand the segments are combined for example into groups, different data sets being computed for different groups. In this way for example it is possible to survey a space within whose partial area there is continuously motion (for example, as a result of public traffic), conversely with another partial area being traversed by only one person (for service).

One simple and effective measure in image evaluation is for example gray level analysis. In the selected segment for example an average of the existing gray level is computed. Histograms of the gray levels (or the color values) can also be determined. In a statistically relevant deviation of the gray level average from the corresponding averages with other time references the video image is switched for example to a surveillance monitor (or an alarm is triggered).

Furthermore data about existing textures, lines and edges can be determined. They can provide information about the position of an article or its orientation. In particular, edges are suitable for determination of the direction of displacement and speed of displacement. The speed and direction can also be computed by comparison of the instantaneous image with one or more previous ones. It can be the immediately preceding (which at an image frequency of for example 25 Hz lags by 1/25 s) or one lagging several cycles. How large the time interval is to be depends on the expected speed of the moving object.

It can be advantageous to identify the moving objects in the image (for example, as a "person", "vehicle", "unknown object"). Allowable parameters can be determined for each object (location, speed, direction). In this way for example extraordinary movements can be distinguished from ordinary ones. (A vehicle travelling on the road and an individual moving on the sidewalk are ordinary events, while an individual moving in a certain direction on the road can be an extraordinary event).

The reliability and false alarm rate can be greatly improved by a suitable, i.e. situation-referenced choice of comparison instants. It may be enough in certain surveillance situations if the statistical comparison is simply referenced to a past, succeeding interval (for example, the last thirty minutes). In more complex situations it can conversely be important to establish the time references to be more selective. Statistical comparison can be limited for example to similar time domains (similar times of day, similar days of the week). It is furthermore possible to define the time references by additional parameters. For example, surveillance situations are conceivable in which the temperature plays a part. I.e. that in a statistical comparison only those data are considered which have a similar parameter value (for example a similar temperature). Furthermore conditions can also be considered. For example, it is possible for an event B to be critical only when it follows event A.

According to one preferred embodiment the video images are filed in a FIFO storage. If an extraordinary state of the surveyed object is ascertained, an alarm is triggered. This leads for example to the fact that the guard acquires control and can play the video sequences contained in the FIFO memory. The guard assesses the situation and assigns it to a certain category ("dangerous", "not dangerous"). This result is stored in the system together with the parameter values which have led to an alarm in this case. In later situations it is possible to incorporate the assessment of the guard into the situation analysis. The false alarm rate can be successively optimized in this way.

In a start-up phase it is also conceivable to selectively train the system. For this purpose certain test situations are played through in the surveillance region (for example, a break-in). The guard marks those video images or instants which must lead to an alarm signal. The system then stores the data or parameters which belong to the corresponding image and determines their statistical deviation from those of a normal situation.

The invention is not limited to analysis of video signals. In particular the evaluation of acoustic signals can also be of interest. Preferably spectral analysis is done. The signal is divided for example in segments with a length of 1 to 10 seconds. Each of this signal segments is broken down for example into blocks with a length in the range from 20 to 50 ms which are transferred with a Fourier transform (FFT) into the spectral region.

To extract the characteristic features for example frequency ranges can be stipulated in which the energy distribution is determined. In this way for example travel noises can be identified. By using specific criteria voice noises can be identified. Upon comparison of succeeding signal segments other information can be obtained (for example regular impact of wheels at track joints). If at this point the system in the invention has ascertained statistically relevant deviations (for example, sudden rise of travel noises, unusual voice noises, etc.) this can be used as an indicator for an extraordinary situation (for example, open doors when a train is moving).

In principle the process in the invention is suitable for any surveillance situation. Its special strength however appears especially in complex situations. They can be found for example wherever an area accessible to the public (entirely or partially) is to be surveyed. One example to the surveillance of money machines. With a system in the invention the passenger compartment of a means of transportation (for example, of a train) can also be continuously surveyed.

Surveillance of production facilities and individual process steps should also be mentioned. Larger areas (for example a nuclear power plant) can be surveyed with several cameras. The evaluation in the invention can acquire data of several cameras as a totality (i.e. as a comprehensive data set) so that logic links between the images of different cameras are possible.

Quite generally it is advantageous to combine several detection devices of different types. Assessment of a surveillance situation using audio and video for example is more reliable than if only audio or only video are present. Also chemical detectors or analysis devices can deliver important information. The choice and composition of the different devices or sensor types of course depend on the specific situation.

The following detailed description and totality of patent claims yield other advantageous embodiments and combinations of features of the invention.

BRIEF DESCRIPTION OF THE DRAWINGS

The drawings used to explain the embodiment show the following.

Basically the same parts are provided with the same reference numbers in the figures.

EMBODIMENTS OF THE INVENTION

Figure 1:
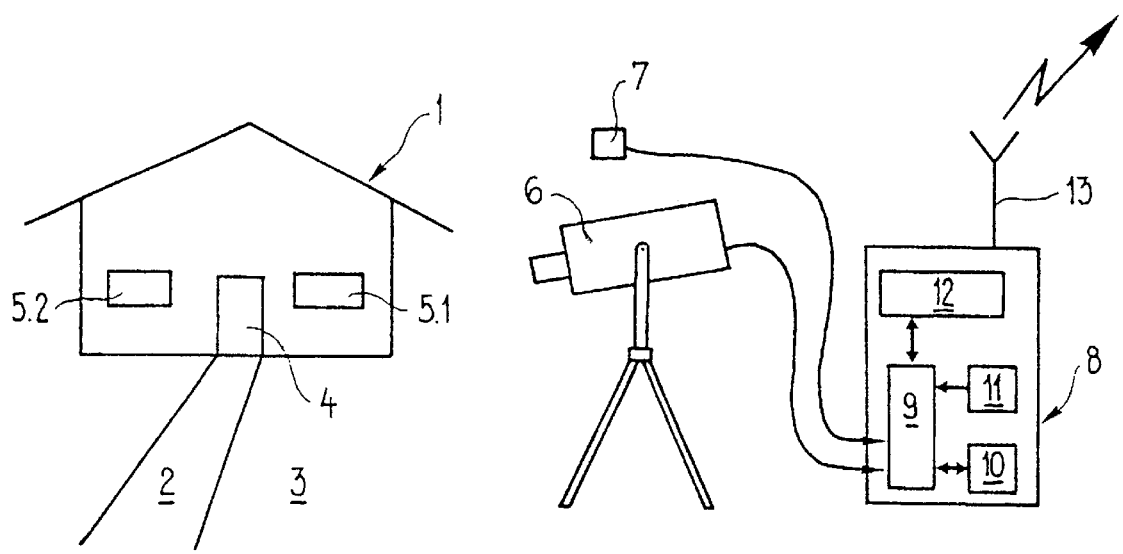
FIG. 1 shows a schematic of one sample surveillance situation.

In the following the invention will be explained using a specific embodiment. FIG. 1 shows a simple surveillance situation. A house 1 is accessed via a private path 2 which runs through a garden 3. On the front of the house 1 are the house doors 4 and two windows 5.1, 5.2.

On the edge of the garden 3 in an elevated position a video camera 6 is mounted such that the house 1, the path 2 and the garden 3 are viewed. In addition to the video cameras 6 there can also be a sensor 7 (for example, a daylight sensor).

The video camera 6 and the sensor 7 are connected to an image processing system 8 which has a processor 9, a data storage 10, a timer 11 and a video storage 12. For data transmission to a surveillance center (not shown) there can be a broadband communications link (for example, a radio signal transmitter 13).

The process in the invention for monitoring the front of the house proceeds as follows.

The video camera 6 runs without interruption. The recorded video images are automatically analyzed by the processor 9 according to various criteria. For each video image this analysis yields a set of characteristic data. They are on the one hand stored together with a time stamp (compare time 11) in a database (in a data storage 10) and on the other hand are statistically compared to selected older data. If a relevant deviation from the totality of past data occurs (i.e. from the statistics formed by the past data), an alarm signal is sent to the surveillance center.

When the indicated alarm signal arrives at the surveillance center, for example the current video signal of the video camera 6 is immediately displayed on a monitor. The guard can now see what is taking place in front of the house 1. If nothing special can be recognized, it can if necessary retrieve the video sequences buffered in the video storage 12 in order to ensure that in fact nothing unusual has occurred. If this is the case the system is notified that it was a false alarm. This information can be used for analysis of later situations.

Figure 2A:
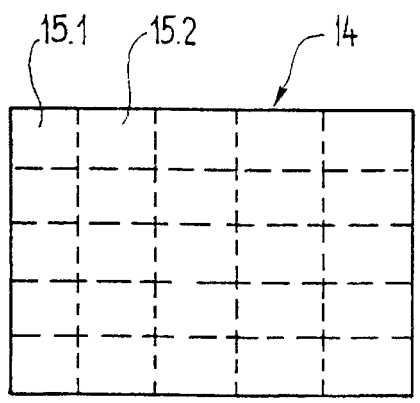
FIGS. 2a, b show two schematics of possible segmentations.

Using FIGS. 2a, b, 3 and 4 it should be explained how analysis of the video images can be advantageously carried out.

Figure 2B:
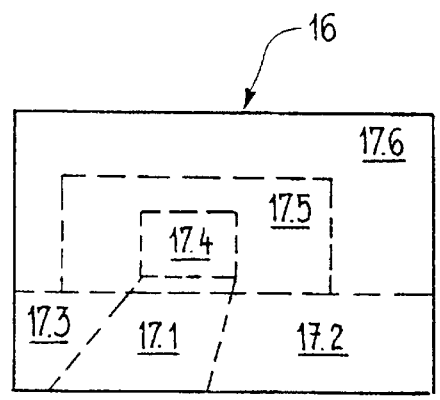

According to one especially preferred embodiment the pixel raster 14 and 16 (which underlies each video image) is divided into a plurality of segments 15.1, 15.2, . . . and 17.1 to 17.6. In FIG. 2a all segments are roughly the same size, i.e. the subdivision corresponds to a regular grid. In FIG. 2b segmenting on the other hand is matched to the specific surveillance situation. Thus for example there is a segment 17.1 which with reference to its shape is matched to the perspective of the path 2 acquired by the video camera 6. Similarly the segments 17.2, 17.3 are matched to the garden 3 on the left and right of the path 2. Furthermore, in this example there is one segment 17.4, 17.5, 17.6 for the house doors 4, the remaining front of the house 1 and the sky respectively. The segments 17.1 and 17.5 are made overlapping in this example.

For each video image for example the gray levels are evaluated. For example, for each segment 17.1 to 17.6 an average value can be determined for the gray levels which occur within it. For example a weighted average (1st order moment) can also be computed from the coordinates of the pixels and their gray level. Another possibility consists in acquiring the statistical distribution of the gray levels (in the form of a histogram or distribution function).

By comparing several video images which follow one another at the same time intervals, furthermore moving objects can be identified and their direction and speed computed.

With the aforementioned analysis process for example it can be ascertained whether and where something changes in the image. These changes are expressed on the one hand in a change of the gray levels or the gray level statistics and on the other hand in the recognition of an object and its position, direction and speed.

Automated analysis is thus not yet ended. In the invention comparison of the ascertained data or features with those of earlier video images now takes place. The meaning of this comparison will be demonstrated using a pair of examples.

That someone is moving on the path 2 to the house 1 is in and of itself not a cause for an alarm. The mailman comes to the house once a day. It is also conceivable that a strange dog runs up to the house 1; nor should this be an alarm situation.

The situation should be assessed differently when someone comes up to the windows 5.1, 5.2. This situation should undoubtedly be labeled extraordinary and should consequently lead to an alarm. Another alarming situation arises for example when something moves towards the doors 4 of the house and then remains there for a given time. (This could means that someone is sleeping in front of the doors 4 or that the detected individual has broken down the doors and penetrated into the house).

There is therefore one characteristic data set for each video image. If a larger number of these data sets is being statistically evaluated, value ranges can be defined for ordinary (i.e. not extraordinary) situations. If the instantaneous data set is now within the value range, the system does nothing. If on the other hand a data set falls outside of the statistically determined value range, for example an alarm signal is transmitted. But it is also conceivable for the situation to be checked using events of earlier alarm situations before an alarm is effectively triggered. This checking can contain for example a computation of the false alarm probability. (For this reason for example it is determined how great the "distance" of the instantaneous data set from the alarm boundary is and how large the "distances" were in earlier false alarms).

Figure 3:
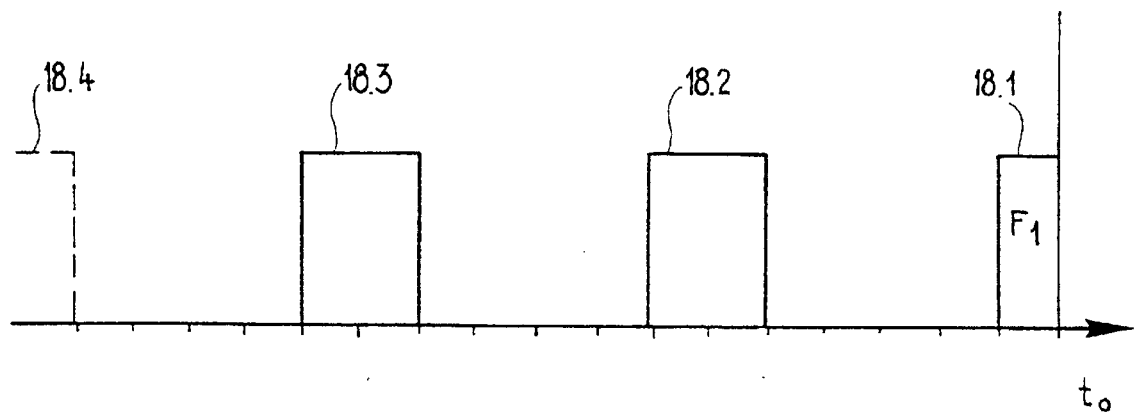
FIG. 3 shows a schematic of selectively chosen time references.

A further refinement of the process as claimed in the invention will be explained using FIG. 3. The current instant is labelled 10. Several time intervals 18.1 to 18.4 are defined on the time axis. They are all for example of the same length and are located at regular time intervals. One such time interval 18.1 to 18.4 can for example be defined by the nighttime hours of different days. For each time interval 18.1 to 18.4 the system performs a statistical evaluation of the data sets. The statistical comparison as claimed in the invention is executed depending on whether the instantaneous time t0 is inside or outside one of the predefined time intervals. If t0 is within one time interval (as is shown in FIG. 3), the current data set is compared only with those statistics resulting from the data sets of the corresponding previous time intervals 18.2 to 18.4. If conversely t0 is outside one such time interval, the statistics are determined based on those data sets which lay outside of the time intervals 18.1 to 18.4 in the past.

The purpose of this statistical evaluation can be explained most simply on a specific example. During the day it is not unusual for an individual to walk towards the house 1 on the path 2. But this is different at night. By statistically evaluating the data sets acquired during the daytime separately from the others, the security and reliability of the system can be increased.

The time references of the data sets which underlie the statistical analysis can be stipulated or established directly or indirectly. In one case it is defined beforehand to which time intervals the time stamp of a data set must belong (for example, nighttime hours, Saturday, holiday) so that the corresponding data set is considered for the statistics. In the other case for example other parameters must be checked for relevance (for example, brightness, temperature, a certain speed of an identified object). If the data sets are stored in a database, in principle it is possible to sort by each element of the data set.

The system can also compile certain criteria using alarm situations or false alarms which have already occurred over time. Specifically the sequence of two or more events can be used as a criterion for relevance. For example it can become apparent with time that the sequence of two certain events A, B is not critical as long as event C does not follow. This concept of the process is advantageous especially when a plurality of video cameras (or additional sensors) is used to monitor larger grounds or a building.

This will be explained using the following example: A deliveryman will normally always arrive at a certain entrance, unload his goods and deposit them at a certain location in the warehouse. A first camera of the surveillance system will recognize the arriving deliveryman, a second one the entry of the deliveryman into the warehouse. Afterwards departure from the warehouse and the delivery truck driving away are recognized. This sequence of events should not lead to an alarm. But if the deliveryman however now proceeds first elsewhere and not directly into the warehouse, this is an extraordinary situation. Likewise it is extraordinary if the deliveryman does proceed into the warehouse, but however he does not depart again within a certain time (whether to retrieve additional goods or to leave the grounds).

Figure 4:
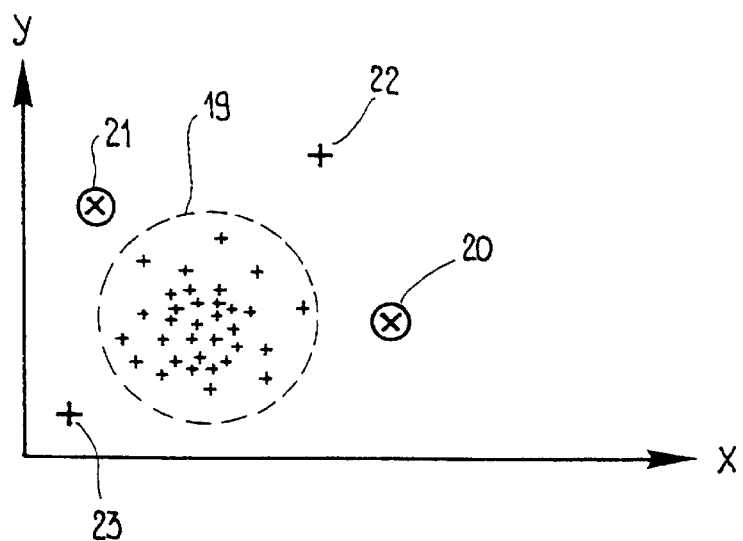
FIG. 4 shows a schematic of the statistical comparison.

The statistical evaluation of the invention can be illustrated on the simplified graphic representation in FIG. 4. The average value of the gray level values present in a certain segment is plotted on the x-axis and the distance of the focus of the gray levels of the segment from a stipulated center of the segment is plotted on the Y axis. Each cross in FIG. 4 marks a data set. Normally the data sets will accumulate in a certain area 19. (Of course the data sets are not all exactly alike, since for example the light conditions and the weather can change over time.).

FIG. 4 shows by way of example four data sets 20, 21, 22, 23 outside of the region 19. Based on statistical comparison the system recognizes that these data sets can identify extraordinary situations. For each of these data sets 20 to 23 the system has triggered an alarm. The guard in all four cases has checked the situation and ascertained that for example only the data sets 20 and 21 have in fact identified alarm situations. I.e. the other two data sets 22 and 23 were false alarms. This assessment is stored in the system and is considered in the next extraordinary situation. In this way the system learns something new with time.

The description in FIG. 4 is only two dimensional for reasons of clarity. In practice a data set can contain n elements so that the statistical evaluation takes place in n dimensions.

It must also be watched that the region 19 over time can change according to ambient conditions. I.e. that the system can be matched to reality. This matching takes place automatically since new and current data sets are continually being stored.

The stability of the system and adaptability can be influenced or checked by the choice of suitable statistical evaluation methods. For example current data sets can be weighted more strongly than the old ones. With this measure adaptation can be accelerated. Conversely it can be slowed down by weak weighting of the recent data sets (this leads to higher stability).

For cost reasons commuter lines and subways are run largely without conductors. This entails specifically a lack of security in margin times. For this purpose at least one video camera and one microphone are installed in each car, for example. (The number of microphones can be easily larger or smaller than the number of the video cameras. To be able to ascertain impacts for example based on acts of vandalism, solid-borne noise microphones can be used). The images and the audio signals can for example be preprocessed in each car with processors integrated into the devices (to determined the characteristic data sets).

Using path sensors and incorporating the speed of the train, time of day, and line sections it becomes possible to compile statistics independent of the respective ambient conditions and to better distinguish dangerous situations from nondangerous ones. (Ambient conditions are for example the noise level of the instantaneous line section or the travelling speed, passenger frequencies, etc.) Certain information (speed, line section, time, etc.) can be supplied by the train control system.

Preferably all detection devices are linked so that the data from different cars can be referenced to one another. If an extraordinary situation is ascertained by the central processing station in the train, the headquarters of the rail network can be alerted via train radio. In doing so preferably the relevant images and possibly audio signals are delivered at the same time. The monitoring personnel can then assess the situation as described above.

Because images need be transmitted to a manned headquarters only in quite defined situations, it is possible to operate with relatively limited radio transmission capacities without having to abandon continuous surveillance.

The specific examples and embodiments can be modified in various ways without departing from the framework of the invention. The physical measurement data from sensors can also be added to the data sets. In particular gas sensors (smoke detectors), photoelectric barriers, motion detectors, etc. can be placed at suitable locations. When using several synchronized video cameras the characteristic data of the video images can be acquired with the same time stamp in a common data set. The video cameras can also be sensitive in the invisible (infrared, for example) spectral range, depending on the application, instead of in the visible range. Optional sensors can also be integrated in the system (pressure sensors, microphones, moisture sensors, etc.).

The process in the invention can be implemented with known means. Primarily the processing of data acquired in real time and the corresponding triggering of system components or alarm signalling are new. Of course the action which is triggered when an extraordinary situation is recognized need amount to nothing more than switching a video signal to a surveillance monitor. For example doors can be locked, head lamps or sirens turned on automatically.

In summary it can be stated that the invention enables automated surveillance of complex situations or surveillance facilitated for the guard.

What is claimed is:

1. A process for surveying a given surveillance area, using a detection device, especially at least one video camera and/or microphone, comprising the steps of:
   a) during a surveillance period, continuously determining a plurality of characteristic data sets from instantaneous signal segments of signals generated by the detection device by automatic signal analysis;
   b) continuously storing said plurality of characteristic data sets in a database;
   c) performing a statistical comparison between a characteristic data set of an instantaneous signal segment of a signal generated by the detection device and at least one decision area generated from said plurality of characteristic data sets stored in the database;
   d) generating an alarm signal if the statistical deviation calculated by the statistical comparison exceeds a statistically determined value range calculated from the plurality of characteristic data sets stored in the database.

2. The process as claimed in claim 1, wherein within the framework of an image analysis in a video image is broken down into several segments and wherein for each segment characteristic data for the data set are determined.

3. The process as claimed in claim 2, wherein gray levels of pixels are statistically evaluated within the framework of the image analysis.

4. The process as claimed in one of claim 2, wherein lines or edges are determined within the framework of the image analysis.

5. The process as claimed in one of claim 2, wherein at least some of the characteristic data are determined by comparison of an instantaneous video image with at least one video image preceding in time.

6. The process as claimed in claim 5, wherein the direction and/or speed of an object is determined by comparison and stored in the data set for an instantaneous video image.

7. The process as claimed in one of claim 1, wherein the statistical comparison is based on one or more selectively chosen time segments.

8. The process as claimed in one of claim 2, wherein video images are buffered in a FIFO storage, wherein when an extraordinary situation is detected, an alarm signal is generated and wherein the situation assessment made by a surveillance officer is used or stored for automatic evaluation of later occurring situations.

9. The process as claimed in claim 8, wherein systematic training is done using test situations in a start-up time.

10. The process as claimed in claim 1, wherein the signal segment is subjected to spectral analysis and wherein the characteristic spectral features are extracted, the underlying signal being especially an acoustic signal.

11. The process of claim 1 used for surveillance of an area accessible to the public, especially a passenger compartment of a means of transportation.

12. An apparatus for surveying a given surveillance area, using a detection device, especially at least one video camera and/or microphone, comprising:
   a) means for continuously determining a plurality of characteristic data sets from instantaneous signal segments of signals generated by the detection device by automatic signal analysis solely during a surveillance period;
   b) a database for continuously storing said plurality of characteristic data sets;
   c) means for performing a statistical comparison between a charateristic data set of segment and at least one decision area generated from said plurality of characteristic data sets stored in the database;
   d) means for generating an alarm signal if the statistical deviation calculated by the statistical comparison exceeds a statistically determined value range calculated from the plurality of characteristic data sets stored at an earlier time of the surveillance period in the database.

* * * * *